US010750010B1

(12) United States Patent
Fowler et al.

(10) Patent No.: US 10,750,010 B1
(45) Date of Patent: Aug. 18, 2020

(54) CALL AUTHORIZATION AND VERIFICATION VIA A SERVICE PROVIDER CODE

(71) Applicant: FIRST ORION CORP., Little Rock, AR (US)

(72) Inventors: Julie Sara Fowler, Kirkland, WA (US); Daniel Francis Kliebhan, Henderson, NV (US)

(73) Assignee: FIRST ORION CORP., Little Rick, AR (US)

( * ) Notice: Subject to any disclaimer, the term of this patent is extended or adjusted under 35 U.S.C. 154(b) by 0 days.

(21) Appl. No.: 16/732,279

(22) Filed: Dec. 31, 2019

(51) Int. Cl.
*H04M 3/42* (2006.01)
*H04L 29/06* (2006.01)

(52) U.S. Cl.
CPC .... *H04M 3/42068* (2013.01); *H04L 65/1006* (2013.01); *H04M 3/42042* (2013.01)

(58) Field of Classification Search
CPC ............ H04M 3/2218; H04M 3/2281; H04M 3/42068; H04M 3/42042; H04M 3/42059; H04M 3/436; H04M 3/5175; H04M 3/54; H04M 15/08; H04M 2203/558; H04M 2203/559; H04M 2203/6027; H04M 2203/6045; H04M 3/382; H04L 63/14; H04L 63/083; H04L 63/0869; H04L 63/101; H04L 65/1006; H04L 45/125; H04L 45/22; H04L 5/1079; G06Q 30/0201; G06F 16/24573
USPC ................. 379/142.01, 142.04, 142.05, 245
See application file for complete search history.

(56) References Cited

U.S. PATENT DOCUMENTS

| | | | | |
|---|---|---|---|---|
| 7,974,395 B2* | 7/2011 | Abramson | ............ | H04M 3/436 |
| | | | | 379/114.14 |
| 9,264,539 B2* | 2/2016 | Lin | ...................... | H04M 3/4365 |
| 9,332,119 B1* | 5/2016 | Danis | ................ | H04M 3/42042 |
| 9,609,120 B2* | 3/2017 | Bennett | ............... | H04M 3/2281 |
| 10,091,349 B1* | 10/2018 | Rao | ...................... | H04M 3/5175 |
| 10,218,839 B2* | 2/2019 | Gupta | ................... | H04M 3/382 |
| 10,389,872 B1* | 8/2019 | Cox | ................... | H04M 3/42068 |
| 10,462,292 B1* | 10/2019 | Stephens | ................ | H04M 3/436 |
| 10,523,813 B1* | 12/2019 | Salour | ..................... | H04L 67/10 |
| 2006/0206709 A1* | 9/2006 | Labrou | ............. | H04W 12/0609 |
| | | | | 713/167 |
| 2008/0112551 A1* | 5/2008 | Forbes | ...................... | H04L 9/32 |
| | | | | 379/142.1 |
| 2014/0269679 A1* | 9/2014 | Gillis | .................... | H04M 15/49 |
| | | | | 370/352 |
| 2015/0103991 A1* | 4/2015 | Albert | ..................... | H04M 3/56 |
| | | | | 379/202.01 |
| 2016/0127808 A1* | 5/2016 | Wong | ................ | H04M 3/42153 |
| | | | | 379/112.04 |

* cited by examiner

*Primary Examiner* — Binh Kien Tieu

(57) ABSTRACT

One example method of operation may include extracting a calling device telephone number from a received call message, querying a verification table for the calling device telephone number, identifying the calling device telephone number and a corresponding service provider network identifier from the verification table, querying a mapping table for the service provider network identifier, and identifying whether a match between the service provider network identifier and a service provider code exists as an entry in the mapping table.

20 Claims, 10 Drawing Sheets

CALL AUTHORIZATION AND VERIFICATION VIA A SERVICE PROVIDER CODE

TECHNICAL FIELD OF THE APPLICATION

This application relates to call number verification, and more specifically to call authorization and verification via a service provider code.

BACKGROUND OF THE APPLICATION

Conventionally, mobile device users receive calls from undesired sources every day and sometimes several times an hour depending on the particular day. The source numbers which are used to dial the users may be local numbers, long-distance numbers, anonymous numbers, spoofed numbers, etc. The calls may be spam calls, scam calls, robocalls, etc.

Validation of calls to identify which calls are legitimate is part of the scam call management process. For example, call origination validation is one approach to identifying whether a call should be routed, answered, blocked, etc. Current approaches to validating calls may require a number of burdensome operations and may not be performed fast enough to maintain a real-time scam call management solution.

SUMMARY OF THE APPLICATION

Example embodiments of the present application provide at least a method that includes at least one of receiving a call message associated with a call, determining a service provider network identifier based on a telephone number of a call origination device, identifying, from the call message, an identity header comprising a link to a public certificate repository storing a public certificate assigned to a service provider network hosting the call origination device, retrieving a service provider code assigned to the service provider network from the public certificate, and determining whether the service provider code matches the service provider network identifier as identified from a verification table.

Another example embodiment may include an apparatus that includes a receiver configured to receive a call message associated with a call, a processor configured to determine a service provider network identifier based on a telephone number of a call origination device, identify, from the call message, an identity header comprising a link to a public certificate repository storing a public certificate assigned to a service provider network hosting the call origination device, retrieve a service provider code assigned to the service provider network from the public certificate, and determine whether the service provider code matches the service provider network identifier as identified from a verification table.

Still another example embodiment may include a non-transitory computer readable storage medium configured to store instructions that when executed cause a processor to perform receiving a call message associated with a call, determining a service provider network identifier based on a telephone number of a call origination device, identifying, from the call message, an identity header comprising a link to a public certificate repository storing a public certificate assigned to a service provider network hosting the call origination device, retrieving a service provider code assigned to the service provider network from the public certificate, and determining whether the service provider code matches the service provider network identifier as identified from a verification table.

Still yet another example embodiment may include a method that includes one or more of extracting a calling device telephone number from a received call message, querying a verification table for the calling device telephone number, identifying the calling device telephone number and a corresponding service provider network identifier from the verification table, querying a mapping table for the service provider network identifier, and identifying whether a match between the service provider network identifier and a service provider code exists as an entry in the mapping table.

Still yet another example embodiment may include an apparatus that includes a processor configured to perform one or more of extract a calling device telephone number from a received call message, query a verification table for the calling device telephone number, identify the calling device telephone number and a corresponding service provider network identifier from the verification table, query a mapping table for the service provider network identifier, and identify whether a match between the service provider network identifier and a service provider code exists as an entry in the mapping table.

Still yet a further example embodiment may include a non-transitory computer readable storage medium configured to store instructions that when executed cause a processor to perform extracting a calling device telephone number from a received call message, querying a verification table for the calling device telephone number, identifying the calling device telephone number and a corresponding service provider network identifier from the verification table, querying a mapping table for the service provider network identifier, and identifying whether a match between the service provider network identifier and a service provider code exists as an entry in the mapping table.

DETAILED DESCRIPTION OF THE APPLICATION

Figure 1:
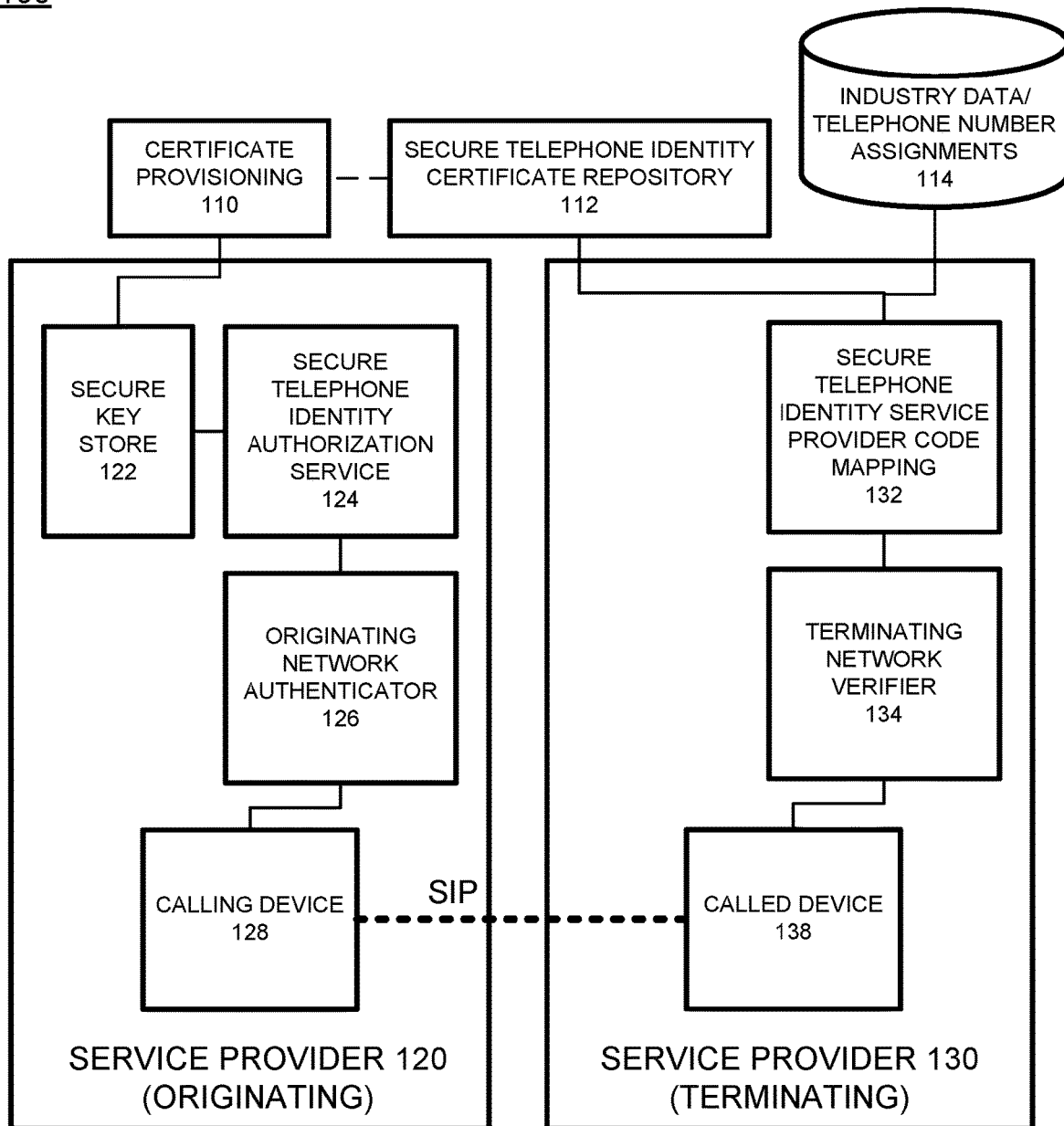
FIG. 1 illustrates an example network configuration of a call processing network for calling and called parties according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide call management of calls placed by a call origination party to a call recipient party. Following the new requirements identified by the Federal communication commission (FCC), such as those outlined in RFC 8226, additional authorization of incoming calls is required to reduce the number of spoof calls. One approach is to require a new service provider code (SPC) which represents a unique identifier for a network provider. Common identifier protocols may include the operating company number (OCN) and the service provider identifier (SPID), however, in the example embodiments in addition to those identifiable service provider identifiers, an addition code, such as the SPC may be cross-referenced to the network identifiers as an added measure to ensure proper authorization. SPCs assigned to service providers may be received and updated by recipient call networks (carriers) to ensure a telephone number matches a network identifier and the network identifier matches the SPC, such an approach offers another layer of authorization. The authentication agent could send the SPC in the certificate so an encoded call payload could be verified by the agent on the receiving end of the call in real-time. For example, a secure telephone identity verification service (STI-VS) can verify a calling number for a given call to a service provider identifier which can be used to verify the SPC as identified from the certificate identified from the call.

FIG. 1 illustrates an example network configuration of a call processing network for calling and called parties according to example embodiments. Referring to FIG. 1, the configuration 100 includes a service provider network 120 for the originating call source and a service provider network 130 for the call termination. In operation, the calling device 128 may be an 'A' call party attempting to call a called device 138 'B' via a call messaging protocol, such as session initiation protocol (SIP), however, other call management protocols may be used to forward and connect calls. As the calling device 128 initiates a call to the calling device 128, the originating network (service provider 120) is issued a public and private key pair, which is placed in the secure key store 122, and a corresponding public certificate placed in the assigned secure telephone identity certificate repository (STI-CR) 112 'certificate repository'. The certificate has a location or identifies a location of a telephone number (TN) authorization list populated with A's service provider's code (SPC). The certificate may be retrieved and provided to the call data message via the certificate provisioning module 110

The secure telephone identity verification service (STI-VS) and SPC mapping module 132 has access to the telephone number assignments to the service provider(s) using authoritative data. The STI-VS 132 also contains a mapping of all service provider network identifiers (SPIDs), or other official network identifiers, belonging to service provider 120 and its assigned SPC value. The service provider's SPC and service provider's IDs (SPIDs, OCN, etc.) do not change frequently, however, the TNs assigned to a service provider are constantly updating. Therefore, the STI-VS 132 requires access to continuous updates, and the data may be stored locally on the STI-VS 132 for low latency real-time call processing. An additional element of this call authorization process is to have flexibility for a variety of unique service provider IDs to a single "code" that represents the authenticating carrier.

Continuing with the same example, when a call is originated in the service provider 120 of the calling device 128. For example, a salesman ('A' party) calling a potential customer ('B' party) in response to a previous question, etc., the originating network authenticator 126 may engage the secure telephone identity authorization service 124 (STI-AS) as part of a call setup configuration to sign the call using certificate cryptography techniques and the service provider A's private key. The STI-AS 124 forms a passport (i.e., RFC 8225) object and populates in the SIP INVITE message an identity header. The "INVITE" is the mechanism to begin call setup in the IP network. The identity header contains the signed-identity-digest containing a base64 encoding of the passport. The identity header in the outgoing SIP INVITE conveys the signature used for validating the asserted authority over the telephone number by the originator and the URI to retrieve the associated public key. With those credentials, parties can assert that they are in fact authorized to use the TNs.

Once the modified SIP INVITE is created to include the identity header, the call is routed to service provider 130, which is the terminating network for delivery to the called device 138 (party 'B'). The network 130 engages the STI-VS 132 to validate the signature in the identity header over the passport object. To perform the validation, the STI-VS 132 identifies the uniform resource identifier (URI) found in the "info" parameter of the identity header to retrieve the service provider A's public certificate stored on the STI-CR 112. The STI-VS 132 may cache the certificate locally to reduce the number of external STI-CR fetches. The STI-VS 132 retrieves the TN authorization list from the public certificate data along with the service provider code (SPC) value within the list. For example, if the SPC for service provider A 120 is 1234, the TN authorization list extension in the certificate is: a. 1.3.6.1.5.5.7.1.26: I. 0 . . . 1234.

In addition to other verification operations, the STI-VS 132 will calculate the network service provider identifier to which the calling number belongs using the value in the 'from' and/or P-asserted identity headers and the telephone number assignment data. Once the network identifier is determined, the STI-VS 132 will use the network identifier to access the SPC in its mapping table. If the mapping matches, TN authorization verification is successful and the network verifier 134 may be instructed to connect the call without dropping or blocking the call, if it does not match, TN authorization list verification with the SPC fails. This result is used as input into the overall verification process. The third party industry data, such as network identifiers and corresponding telephone numbers may be retrieved (in real-time) from a data repository 114 that is accessed on a per call basis.

As pre-requisite to verifying the call, the STI-VS 132 must have access to the telephone number assignments to the service provider data 114 using authoritative data which is portability-corrected where applicable. The STI-VS 132 retrieves/receives regular updates to this "TN Assignment" data and stores the information. All legitimate telephone numbers owned by service providers are included. The STI-VS 132 also has real-time access to the calling party (A-Party) telephone number for a given call by extracting it from the SIP INVITE message.

Figure 2:
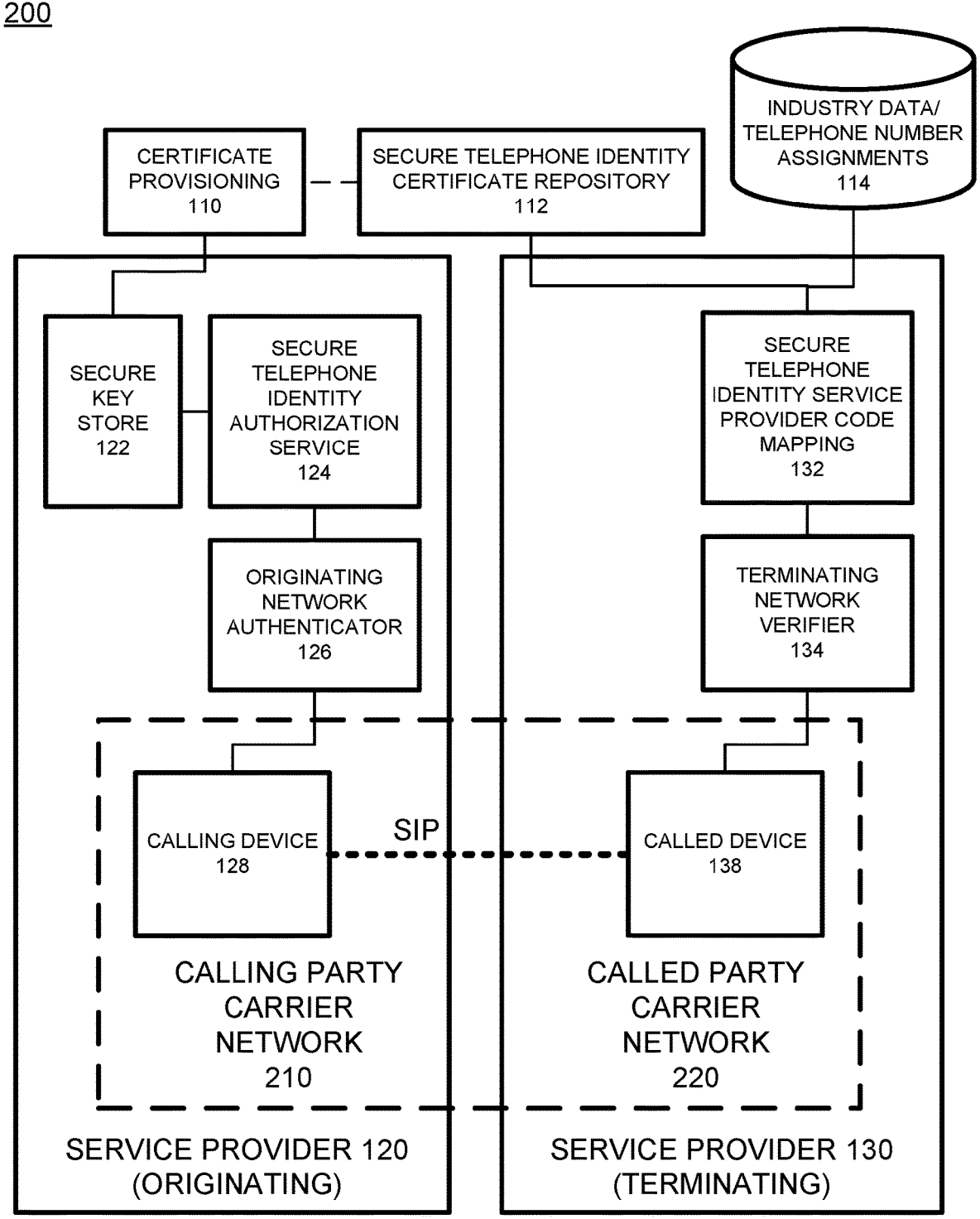
FIG. 2 illustrates the call network configuration with the carrier networks identified according to example embodiments.

FIG. 2 illustrates the call network configuration with the carrier networks identified according to example embodiments. Referring to FIG. 2, the configuration 200 demonstrates the carrier portion of the network. For example, the calling and called parties may be managed by carrier networks 210/220, however, the authorization portion of the call processing may be provided by a third party that supports the carrier networks. In addition to SIP, the STI-VS and STI-AS may use HTTP REST instead of SIP, such as for verification/authorization.

Figure 3:
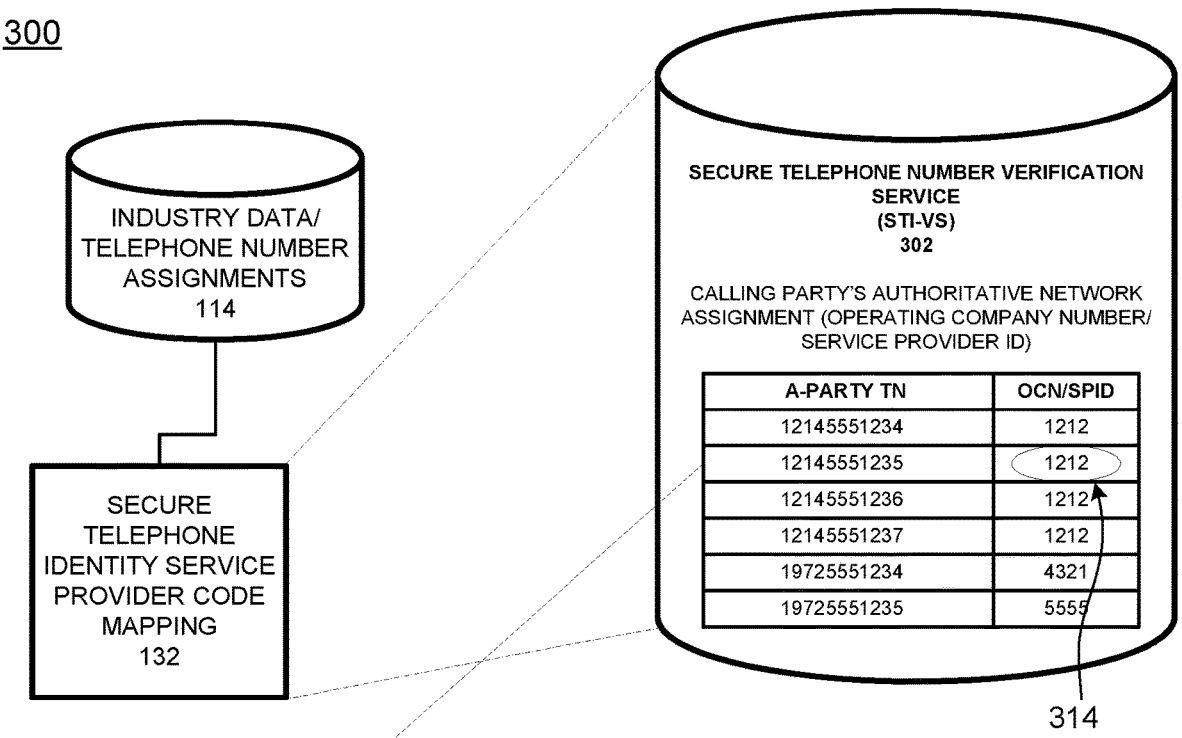
FIG. 3 illustrates calling party number and network identifier identification procedure according to example embodiments.

FIG. 3 illustrates calling party number and network identifier identification procedure according to example embodiments. Referring to FIG. 3, the configuration 300 provides an example where the telephone number identified from the call data message is used to identify a calling party network identifier. In the SIP INVITE message, the origination telephone number is identified 312 and used to identify the assigned network identifier 314. This is one form of authentication/authorization and/or verification that ensures the calling number has a known network identifier. If the telephone number is not matched to any network identifiers, then the telephone number may not be authorized.

In operation, the STI-VS 132 extracts the A-Party telephone number (TN) from the from (or P-Asserted-Identity) header of the incoming SIP INVITE. The TN is 12145551235 312. The STI-VS 132 searches for the TN in its "TN Assignment" data. If the A-Party number is not found in the list/table 302, the process stops at this point and TN authorization list check operation fails. If the A-Party number is found, the STI-VS now has the network provider identifier code, such as an OCN or SPID. The number 12145551235 is the calling party number and is assigned to the network represented by the identifier 1212, which becomes the unique identify for the next step in TN authorization list verification process.

Figure 4:
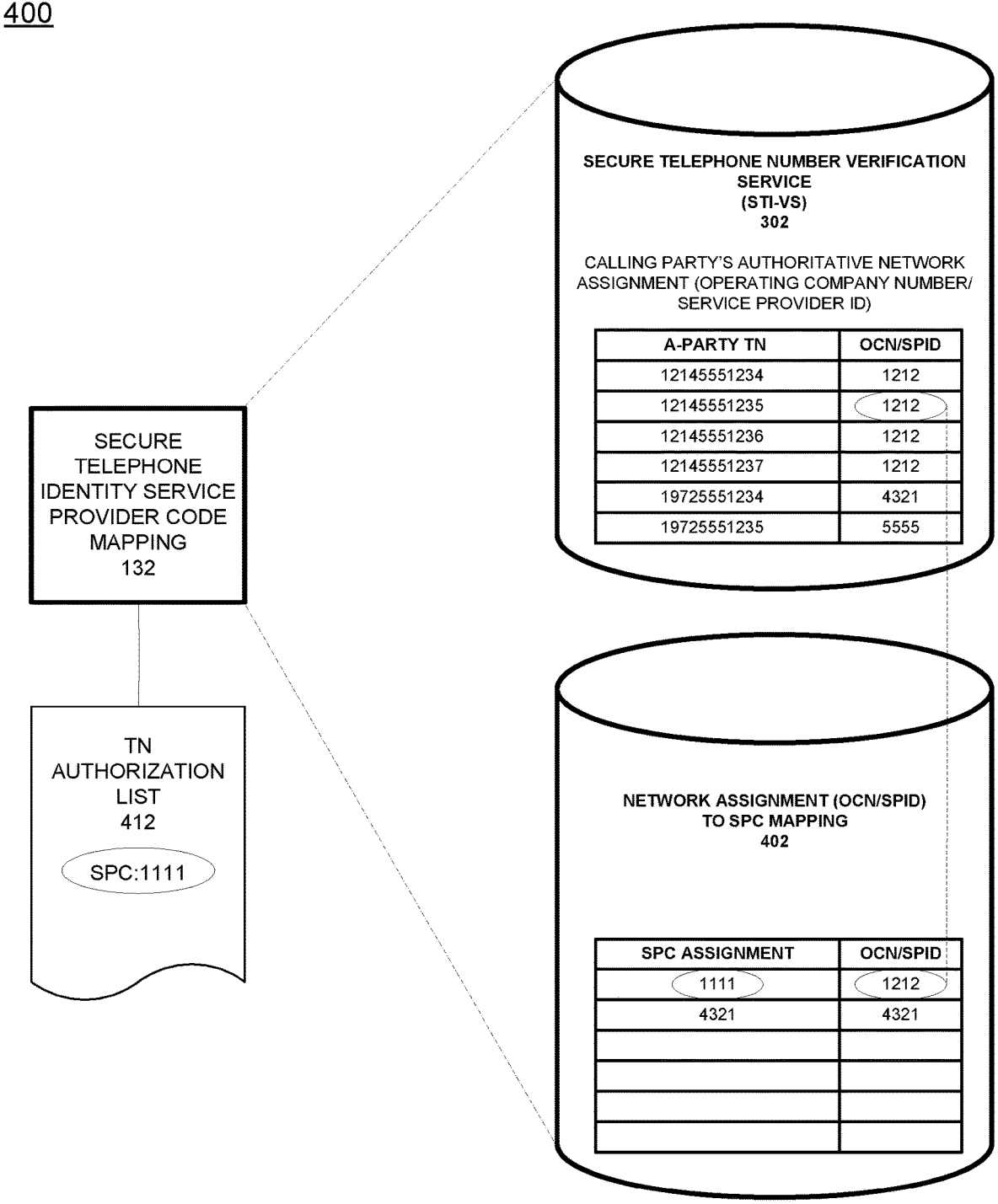
FIG. 4 illustrates a network identifier and service provider code matching procedure according to example embodiments.

FIG. 4 illustrates a network identifier and service provider code matching procedure according to example embodiments. Referring to FIG. 4, the configuration 400 provides that the STI-VS 132 retrieves a service provider code (SPC) from the service provider A's public certificate. In this example, the certificate SPC is extracted from the authorization list 412 as '1111' Continuing with the example from FIG. 3, the calling party number is '12145551235', which is represented by network identifier 1212. In order to perform SPC verification, the STI-VS 132 contains a mapping of all SPIDs, or other service provider network identifier, belonging to service provider 'A' to their chosen SPC value such that a single SPC can be encoded and maintained in the public certificate, as illustrated in table 402. By having a custom SPC in addition to telephone numbers, registered network identifiers and other information, the mapping performed can provide a heightened degree of authorization to reduce spoof callers that do not have the proper credentials.

Continuing with the same example, the STI-VS 132 searches for the network identifier in its network assignment to SPC mapping table data. In our example, 1234 is found in the SPC mapping table and corresponds to SPC assignment 1111. This could be numeric or any unique identifier that is exchanged between carriers such that the procedure can determine what to expect from the authenticating agent. The STI-VS 132 now has everything needed to complete the TN authorization list SPC verification via the mapping table 402. The A-Party TN is matched with a service provider network ID (OCN/SPID) in a first table, which is matched with a SPC assignment value via a second table. If the network ID is not present and/or the SPC value is not in the table and/or the SPC in the authorization list data extracted from the call data is not found in the mapping table, the call me be dropped/blocked and/or the call may fail verification. The next operation in the process is comparing the SPC value from the TN authorization list in the origination network's certificate with the SPC assignment value found in the mapping table. In this example, the certificate SPC value is '1111' and the SPC assignment value is '1111', and the value matches the network identifier of the telephone number of the caller, and thus, the call will be placed through to the destination. If any of the necessary pieces of information are missing or do not match, the verification is not successful.

Figure 5:
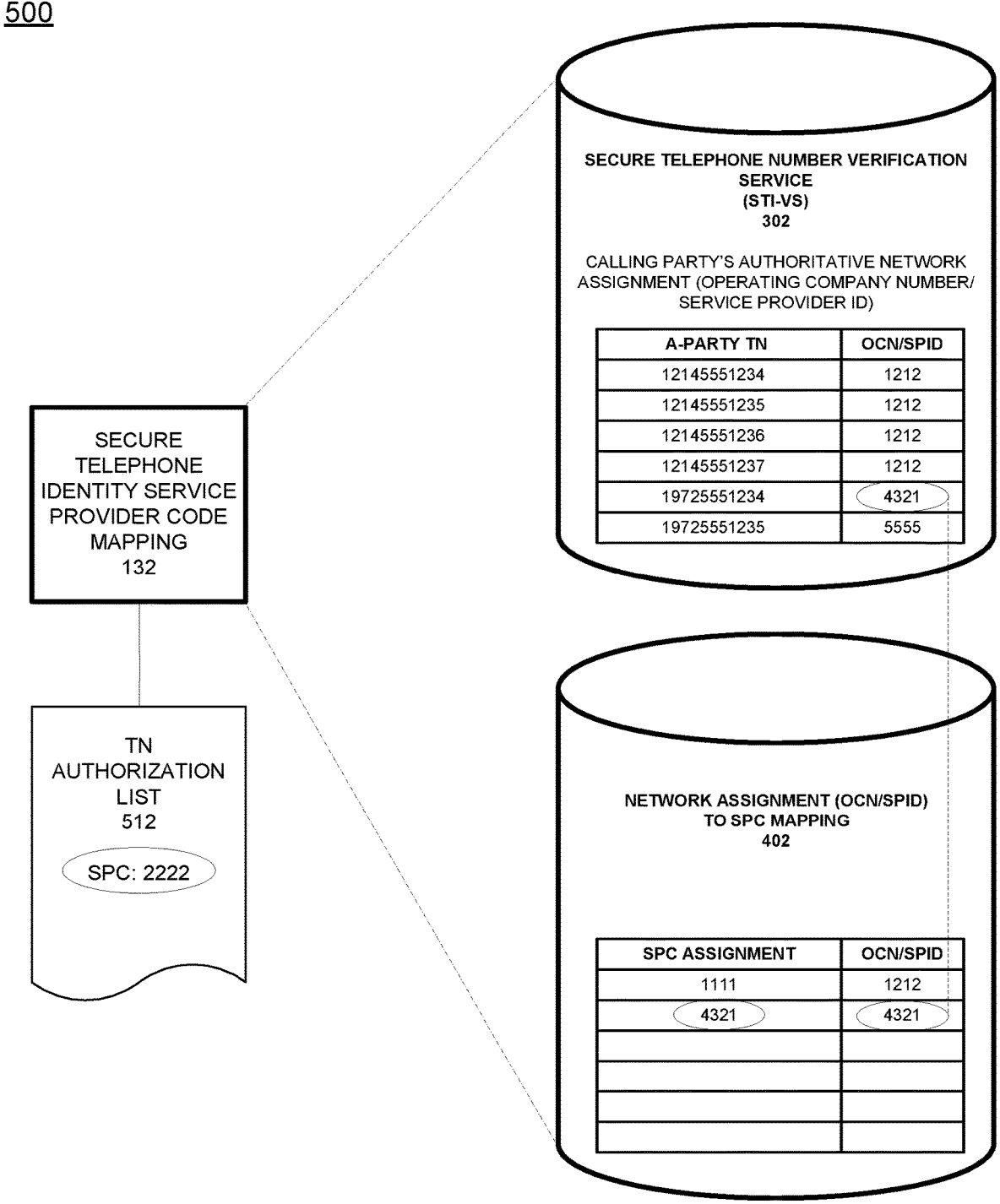
FIG. 5 illustrates a service provider code mismatch procedure according to example embodiments.

FIG. 5 illustrates a service provider code mismatch procedure according to example embodiments. Referring to FIG. 5, in this example, the configuration 500 provides an example where the network identifier is matched with the calling device telephone number, however, the mapping code '2222' extracted from the call data authorization list 512 is not part of the mapping table 402. In this example, the network identifier is paired with a SPC assignment that is not the same as the SPC identified from the certificate data, and thus the number is likely spoofed or from an invalid/unregistered source, and thus the call will be dropped.

Figure 6:
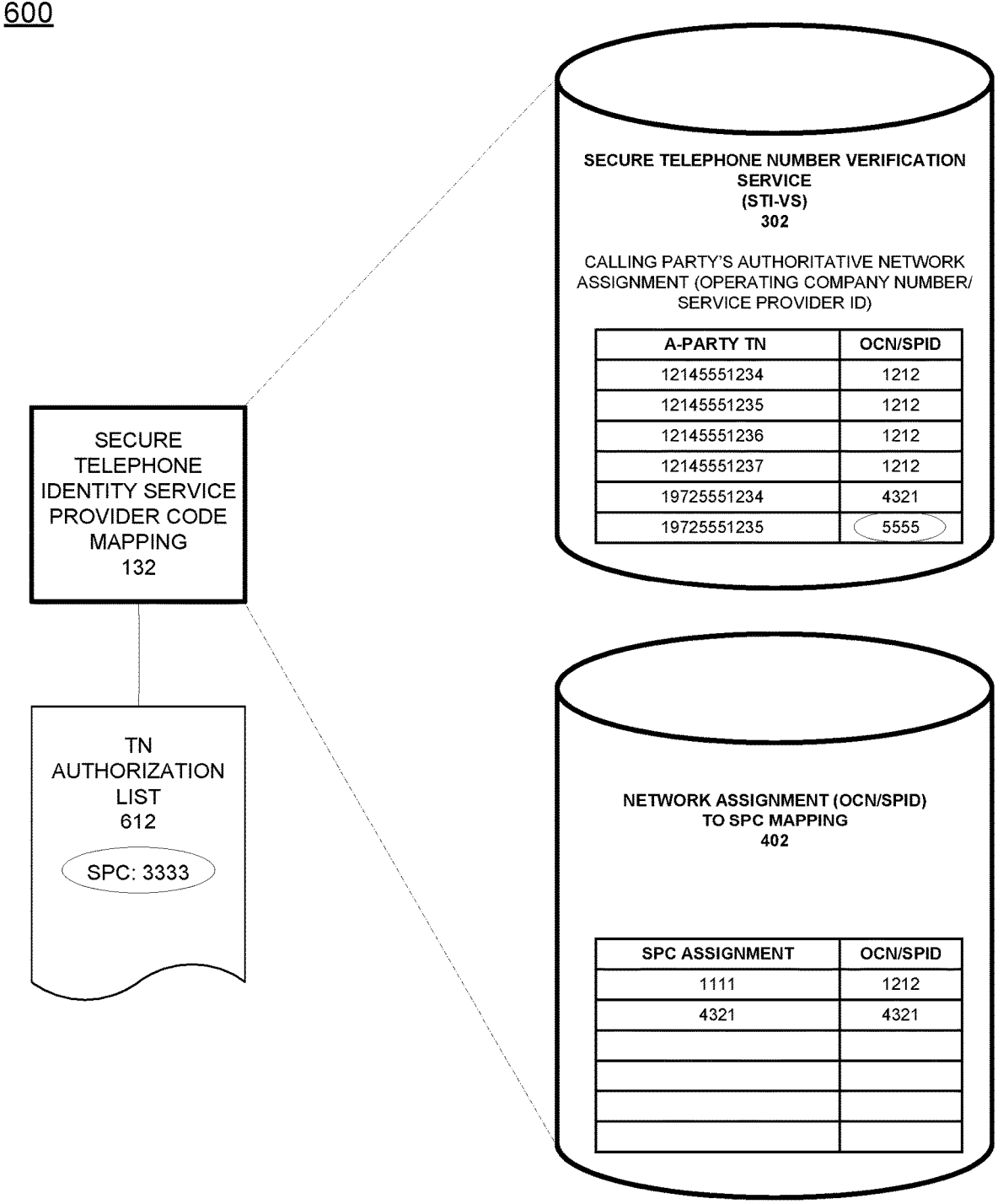
FIG. 6 illustrates a network identifier mismatch procedure according to example embodiments.

FIG. 6 illustrates a network identifier mismatch procedure according to example embodiments. Referring to FIG. 6, in this example, the network identifier for the calling party is '5555' and is found in the verification list table 302 but is not found in the SPC mapping table 402, and so the verification process cannot be completed for the SPC identified from the call data. In one example, all the components of the SPC mapping process are part of the STI-VS including the mapping component 132 and the database elements 302/402. The mapping code '3333' extracted from the call data authorization list 612 is not part of the mapping table 402.

Figure 7:
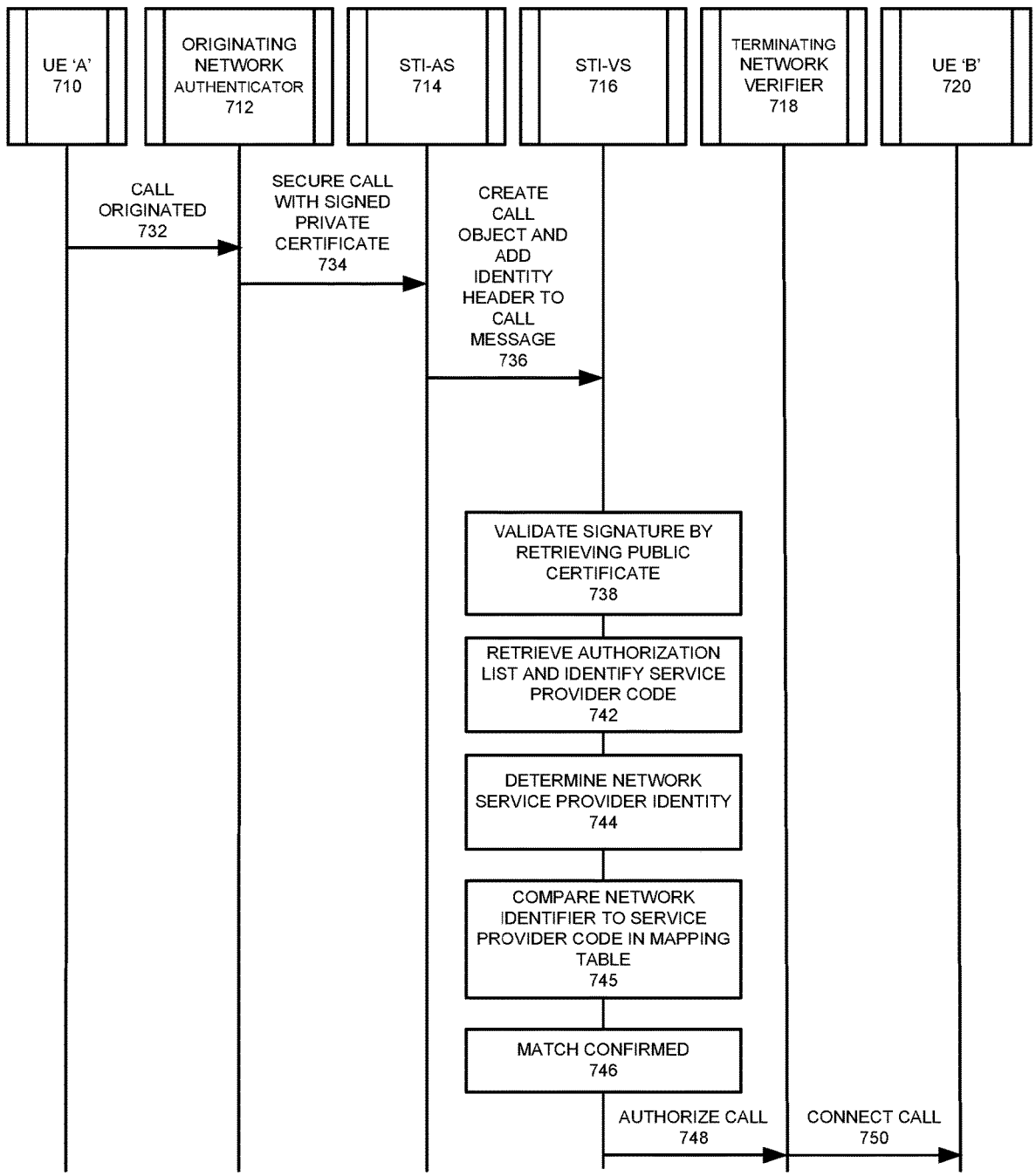
FIG. 7 illustrates a system configuration of a call being placed and authorized by a call network configuration with an authorization list verification according to example embodiments.

FIG. 7 illustrates a system configuration of a call being placed and authorized by a call network configuration with an authorization list verification according to example embodiments. Referring to FIG. 7, the system configuration 700 includes an example of a call being originated 732 by a user equipment 'A' (UE) 710. The originating network authenticator 712 will manage the call processing by including in the call message a signed private certificate 734 used to provide call security. The calling side will use a secure telephone number verification agent service STI-AS 714 to create the call object and add identity header data to the call message 736 via call data sources, such as the certificate authority or other elements demonstrated in FIG. 1. Also, the authenticator 712 and the STI-AS 714 may be considered the same component for practical example purposes. The secure telephone number verification service 716 will receive and process the call data to perform various operations, such as validating the signature of the private key via a corresponding public key certificate 738, retrieving an authorization list and identifying a service provider code (SPC) 742, determining a network service provider identity 744 from the calling party information, and comparing the network service provider identifier to the service provider code (SPC) 745. When a match is confirmed 746 the call may be authorized 748 via the terminating network verified 718 and connected 750 from the caller to the callee user equipment 'B' 720. Also, the verifier 718 and the STI-VS 716 may be considered the same component for practical example purposes.

Figure 8A:
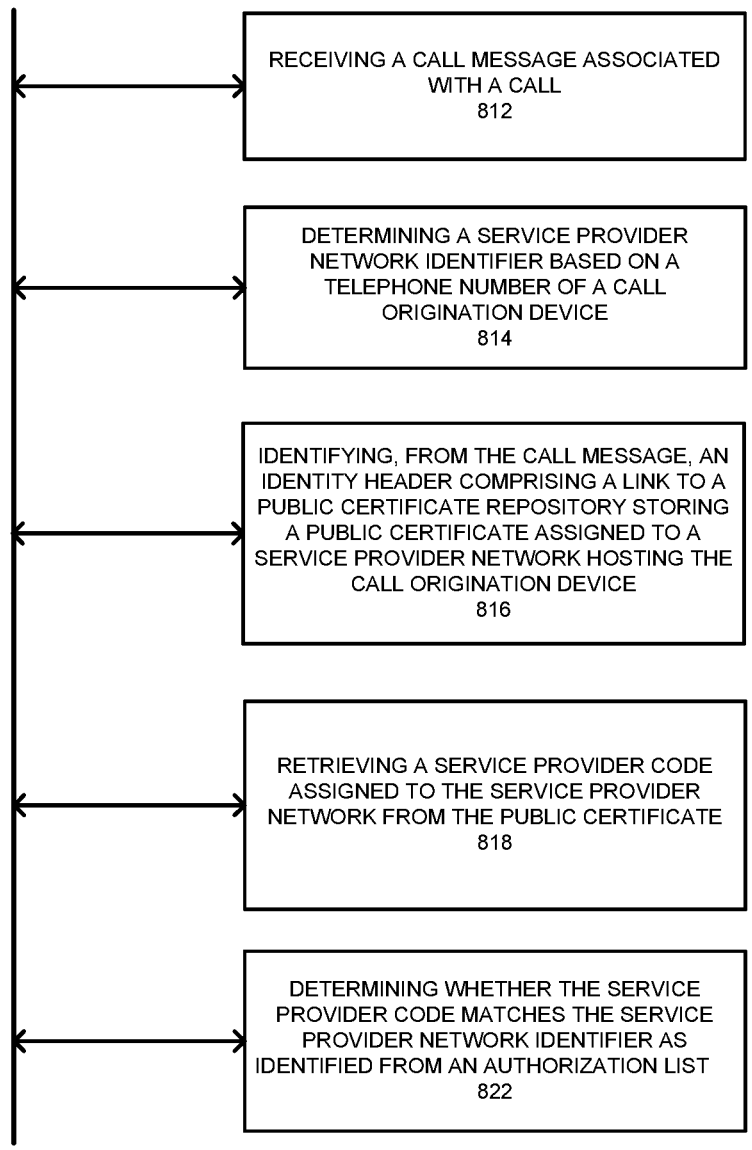
FIG. 8A illustrates a logic flow diagram of a call verification procedure according to example embodiments.

FIG. 8A illustrates a logic flow diagram of a call authorization procedure according to example embodiments. Referring to FIG. 8A, the process 800 may include receiving a call message associated with a call 812 from a calling device. The method may also include determining a service provider network identifier based on a telephone number of a call origination device 814, identifying, from the call message, an 'Identity' header having a link to a public certificate repository storing a public certificate assigned to a service provider network hosting the call origination device 816, retrieving a service provider code assigned to the service provider network from the public certificate 818, and determining whether the service provider code matches 822 the service provider network identifier as identified from a verification list. The mapping may also include identifying a service provider network from a calling party number that is received and comparing the SPC assigned to that service provider network to the SPC in the certificate 818.

The process may also include, when the service provider code matches the service provider network identifier as an entry in the verification table, authorizing the call to be completed. When the service provider code does not match the service provider network identifier as an entry in the authorization table, blocking the call. The call message may be a session initiation protocol (SIP) INVITE message and the telephone number of the call origination device is identified from the SIP INVITE message. The authorization list is stored in the public certificate, and the process may also include retrieving a first table having calling party assigned telephone numbers and corresponding service provider network identifiers, retrieving a second table comprising the service provider network identifiers and corresponding service provider codes, and identifying, via the first table, the service provider network identifier of the calling number. The process may also include identifying, via the second table, the service provider network identifier has an entry that matches the service provider code.

Figure 8B:
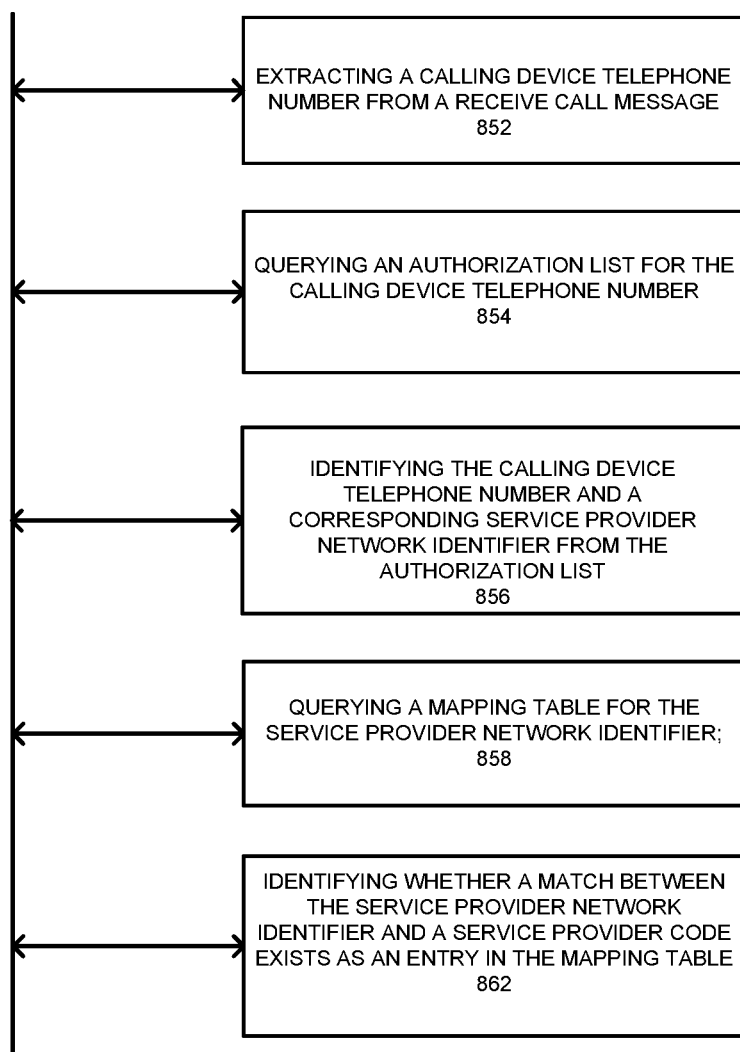
FIG. 8B illustrates a logic flow diagram of a call verification procedure according to example embodiments.

FIG. 8B illustrates a logic flow diagram of a call verification procedure according to example embodiments. Referring to FIG. 8B, the process 850 may include extracting a calling device telephone number from a receive call message 852, querying the verification list for the calling device telephone number 854, and identifying the calling device telephone number and a corresponding service provider network identifier from the authorization list 856. Also, the calling telephone number may be identified from the network messaging and the STI-VS will then compare the telephone number to a telephone number in the "Identity" header. The process may also include querying a mapping table for the service provider network identifier 858, and identifying whether a match between the service provider network identifier and a service provider code exists as an entry in the mapping table 862. The process may also include retrieving the service provider code from a public certificate assigned to the calling device. The SPC is extracted from the public certificate. The calling device telephone number is extracted from an identity header of the call message and the message is an incoming session initiation protocol (SIP) INVITE message, and when there is a match between the service provider network identifier and the service provider code in the mapping table, the process include authorizing a call associated with the call message, when there is not a match between the service provider network identifier and the service provider code in the mapping table, the process may provide blocking a call associated with the call message or just not verifying the call which could lead to other results. The process also includes determining the service provider network identifier does not exist in the mapping table, and blocking or not verifying a call associated with the call message.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 9:
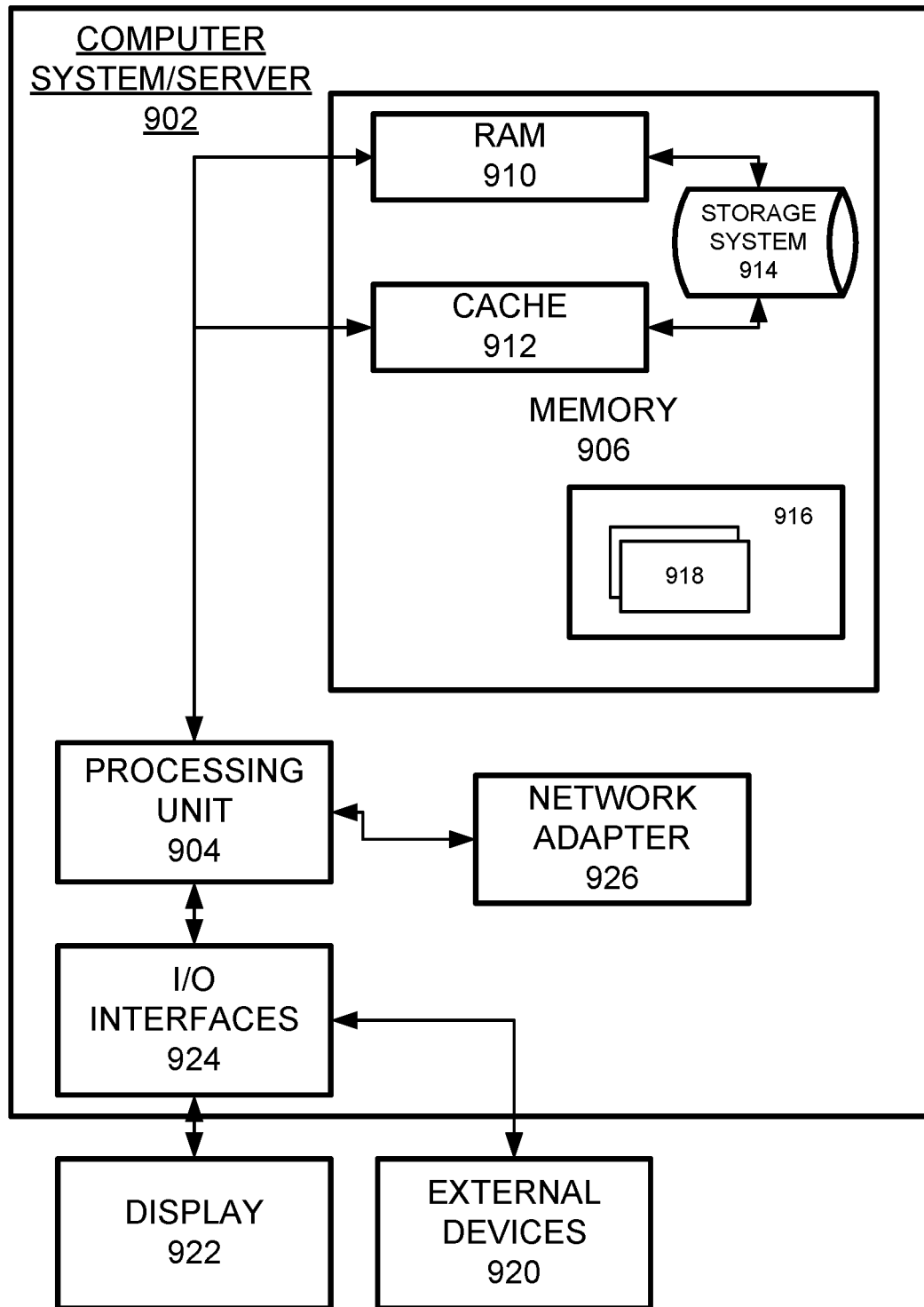
FIG. 9 illustrates an example network entity device configured to store instructions, software, and corresponding

FIG. 9 illustrates an example network entity device configured to store instructions, software, and corresponding hardware for executing the same, according to example embodiments of the present application. FIG. 9 is not intended to suggest any limitation as to the scope of use or functionality of embodiments of the application described herein. Regardless, the computing node 900 is capable of being implemented and/or performing any of the functionality set forth hereinabove.

In computing node 900 there is a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
    extracting a calling device telephone number from a received call message;
    querying a verification table for the calling device telephone number;
    identifying the calling device telephone number and a corresponding service provider network identifier from the verification table;
    querying a mapping table for the service provider network identifier; and
    identifying whether a match between the service provider network identifier and a service provider code exists as an entry in the mapping table.

2. The method of claim 1, comprising:
    retrieving the service provider code from a public certificate assigned to the calling device.

3. The method of claim 1, wherein the calling device telephone number is extracted from an identity header of the call message.

4. The method of claim 1, wherein the message is an incoming session initiation protocol (SIP) INVITE message.

5. The method of claim 1, wherein when there is a match between the service provider network identifier and the service provider code in the mapping table, authorizing a call associated with the call message.

6. The method of claim 1, wherein when there is not a match between the service provider network identifier and the service provider code in the mapping table, blocking a call associated with the call message.

7. The method of claim 1, comprising:
    determining the service provider network identifier does not exist in the mapping table; and
    blocking a call associated with the call message.

8. An apparatus comprising:
    a processor configured to extract a calling device telephone number from a received call message;
    query a verification table for the calling device telephone number;
    identify the calling device telephone number and a corresponding service provider network identifier from the verification table;
    query a mapping table for the service provider network identifier; and
    identify whether a match between the service provider network identifier and a service provider code exists as an entry in the mapping table.

9. The apparatus of claim 8, wherein the processor is further configured to
    retrieve the service provider code from a public certificate assigned to the calling device.

10. The apparatus of claim 8, wherein the calling device telephone number is extracted from an identity header of the call message.

11. The apparatus of claim 8, wherein the message is an incoming session initiation protocol (SIP) INVITE message.

12. The apparatus of claim 8, wherein when there is a match between the service provider network identifier and the service provider code in the mapping table, the processor authorizes a call associated with the call message.

13. The apparatus of claim 8, wherein when there is not a match between the service provider network identifier and the service provider code in the mapping table, the processor blocks a call associated with the call message.

14. The apparatus of claim 8, wherein the processor is further configured to
    determine the service provider network identifier does not exist in the mapping table; and
    block a call associated with the call message.

15. A non-transitory computer readable storage medium configured to store instructions that when executed cause a processor to perform:

extracting a calling device telephone number from a received call message;

querying a verification table for the calling device telephone number;

identifying the calling device telephone number and a corresponding service provider network identifier from the verification table;

querying a mapping table for the service provider network identifier; and identifying whether a match between the service provider network identifier and a service provider code exists as an entry in the mapping table.

16. The non-transitory computer readable storage medium of claim 15, wherein the processor is further configured to perform:

retrieving the service provider code from a public certificate assigned to the calling device.

17. The non-transitory computer readable storage medium of claim 15, wherein the calling device telephone number is extracted from an identity header of the call message.

18. The non-transitory computer readable storage medium of claim 15, wherein the message is an incoming session initiation protocol (SIP) INVITE message.

19. The non-transitory computer readable storage medium of claim 15, wherein when there is a match between the service provider network identifier and the service provider code in the mapping table, authorizing a call associated with the call message.

20. The non-transitory computer readable storage medium of claim 15, wherein when there is not a match between the service provider network identifier and the service provider code in the mapping table, blocking a call associated with the call message.

* * * * *